(12) United States Patent
Zhou et al.

(10) Patent No.: US 9,356,954 B2
(45) Date of Patent: *May 31, 2016

(54) INTERCEPTING AND SUPERVISING CALLS TO TRANSFORMED OPERATIONS AND OBJECTS

(71) Applicant: Shape Security, Inc., Mountain View, CA (US)

(72) Inventors: Xiaoming Zhou, Sunnyvale, CA (US); Roger Hoover, Granite Canon, WY (US); Sergey Shekyan, Redwood City, CA (US); Justin Call, Santa Clara, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,389

(22) Filed: Feb. 10, 2015

(65) Prior Publication Data

US 2015/0207816 A1 Jul. 23, 2015

Related U.S. Application Data

(63) Continuation of application No. 14/159,374, filed on Jan. 20, 2014, now Pat. No. 8,954,583.

(51) Int. Cl.
*G06F 15/173* (2006.01)
*G06F 9/00* (2006.01)
(Continued)

(52) U.S. Cl.
CPC ........ *H04L 63/1466* (2013.01); *G06F 9/30181* (2013.01); *G06F 9/548* (2013.01);
(Continued)

(58) Field of Classification Search
CPC .................. G06F 21/00; G06F 21/128; G06F 9/547–9/548; H04L 29/069111–29/06938; H04L 29/08675; H04L 12/2602–12/2631; H04L 63/1466–63/1475; H04L 41/0246–41/0253
See application file for complete search history.

(56) References Cited

U.S. PATENT DOCUMENTS 5,003,596 A 3/1991 Wood et al.
5,315,657 A 5/1994 Abadi et al.
(Continued)

FOREIGN PATENT DOCUMENTS

GB 2 443 093 A 4/2008
WO WO00/72119 A2 11/2000
(Continued)

OTHER PUBLICATIONS

International Searching Authority, "Search Report" in application No. PCT/US15/12072, dated Jan. 20, 2015, 14 pages.
(Continued)

*Primary Examiner* — Brendan Higa
(74) *Attorney, Agent, or Firm* — Hickman Palermo Becker Bingham LLP

(57) ABSTRACT

In an embodiment, a method comprises intercepting a first set of instructions from a server computer that define one or more objects and one or more original operations that are based, at least in part, on the one or more objects; modifying the first set of instructions by adding one or more supervisor operations that are based, at least in part, on the one or more objects; transforming the one or more original operations to produce one or more transformed operations that are based, at least in part, on the one or more supervisor operations; rendering a second set of instructions which define the one or more supervisor operations and the one or more transformed operations; sending the second set of instructions to a remote client computer.

19 Claims, 7 Drawing Sheets

(51) Int. Cl.

| | | |
|---|---|---|
| *H04L 29/06* | (2006.01) | |
| *H04L 12/24* | (2006.01) | |
| *G06F 9/30* | (2006.01) | |
| *G06F 21/51* | (2013.01) | |
| *G06F 9/54* | (2006.01) | |

(52) U.S. Cl.
CPC ........... *G06F 21/51* (2013.01); *H04L 41/0253* (2013.01); *H04L 63/0281* (2013.01); *H04L 67/42* (2013.01); *G06F 2209/542* (2013.01)

(56) References Cited

U.S. PATENT DOCUMENTS

| | | | |
|---|---|---|---|
| 5,870,769 A * | 2/1999 | Freund | G06F 17/30899 707/E17.119 |
| 5,987,611 A * | 11/1999 | Freund | G06F 21/552 726/4 |
| 6,006,328 A | 12/1999 | Drake | |
| 6,170,020 B1 | 1/2001 | Blakeney | |
| 6,275,789 B1 | 8/2001 | Moser | |
| 6,401,077 B1 * | 6/2002 | Godden | G06Q 30/06 705/26.8 |
| 6,938,170 B1 | 8/2005 | Kraft | |
| 6,957,229 B1 | 10/2005 | Dyor | |
| 7,103,180 B1 | 9/2006 | McGregor | |
| 7,180,895 B2 | 2/2007 | Smith | |
| 7,480,385 B2 | 1/2009 | Weber | |
| 7,580,521 B1 | 8/2009 | Spies et al. | |
| 7,707,223 B2 | 4/2010 | Zubenko et al. | |
| 7,836,425 B2 | 11/2010 | Rubin et al. | |
| 7,895,653 B2 | 2/2011 | Calo et al. | |
| 7,940,657 B2 | 5/2011 | Perreault | |
| 7,975,308 B1 | 7/2011 | Satish et al. | |
| 8,020,193 B2 | 9/2011 | Bhola et al. | |
| 8,170,020 B2 | 5/2012 | Oliver et al. | |
| 8,200,958 B2 | 6/2012 | Coppola et al. | |
| 8,220,054 B1 | 7/2012 | Lu | |
| 8,266,202 B1 | 9/2012 | Colton et al. | |
| 8,516,080 B2 * | 8/2013 | Chow | G06F 17/30902 709/203 |
| 8,548,998 B2 | 10/2013 | Plotnik | |
| 8,584,233 B1 | 11/2013 | Yang | |
| 8,601,064 B1 | 12/2013 | Liao | |
| 8,676,273 B1 | 3/2014 | Fujisaki | |
| 8,954,583 B1 | 2/2015 | Zhou et al. | |
| 2002/0016918 A1 | 2/2002 | Tucker et al. | |
| 2003/0159063 A1 | 8/2003 | Apfelbaum et al. | |
| 2004/0101142 A1 | 5/2004 | Nasypny | |
| 2004/0162994 A1 | 8/2004 | Cohen | |
| 2004/0230889 A1 | 11/2004 | Ishiyama | |
| 2004/0249938 A1 * | 12/2004 | Bunch | H04L 12/2602 709/224 |
| 2006/0015941 A1 | 1/2006 | McKenna | |
| 2006/0034455 A1 | 2/2006 | Damgaard et al. | |
| 2006/0053295 A1 | 3/2006 | Madhusudan et al. | |
| 2006/0156278 A1 | 7/2006 | Reager | |
| 2006/0195588 A1 | 8/2006 | Pennington et al. | |
| 2007/0064617 A1 | 3/2007 | Reves | |
| 2007/0074227 A1 | 3/2007 | Naidu et al. | |
| 2008/0025496 A1 | 1/2008 | Smith et al. | |
| 2008/0222736 A1 | 9/2008 | Boodaei et al. | |
| 2008/0229394 A1 | 9/2008 | Stering et al. | |
| 2008/0244078 A1 | 10/2008 | Viljuen et al. | |
| 2008/0250310 A1 | 10/2008 | Chen | |
| 2008/0320567 A1 * | 12/2008 | Shulman | H04L 63/1416 726/4 |
| 2009/0144829 A1 | 6/2009 | Grigsby et al. | |
| 2009/0193497 A1 | 7/2009 | Kikuchi | |
| 2009/0193513 A1 | 7/2009 | Agarwal et al. | |
| 2009/0216882 A1 * | 8/2009 | Britton | H04L 12/2602 709/224 |
| 2009/0249310 A1 | 10/2009 | Meijer et al. | |
| 2009/0282062 A1 | 11/2009 | Husic | |
| 2010/0037150 A1 | 2/2010 | Sawant | |
| 2010/0131512 A1 * | 5/2010 | Ben-Natan | G06F 17/30306 707/741 |
| 2010/0257354 A1 | 10/2010 | Johnston et al. | |
| 2010/0262780 A1 | 10/2010 | Mahan | |
| 2010/0287132 A1 | 11/2010 | Hauser | |
| 2011/0015917 A1 | 1/2011 | Wang et al. | |
| 2011/0022846 A1 | 1/2011 | Ginter et al. | |
| 2011/0107077 A1 | 5/2011 | Henderson et al. | |
| 2011/0255689 A1 | 10/2011 | Bolotov et al. | |
| 2011/0296391 A1 | 12/2011 | Gass et al. | |
| 2012/0022942 A1 | 1/2012 | Holloway et al. | |
| 2012/0030248 A1 | 2/2012 | Blinnikka | |
| 2012/0096116 A1 | 4/2012 | Mislove et al. | |
| 2012/0124372 A1 | 5/2012 | Dilley et al. | |
| 2012/0173699 A1 * | 7/2012 | Niemela | H04L 63/101 709/224 |
| 2012/0174225 A1 | 7/2012 | Shyamsunder | |
| 2012/0180021 A1 | 7/2012 | Byrd et al. | |
| 2012/0198528 A1 | 8/2012 | Baumhof | |
| 2012/0255006 A1 | 10/2012 | Aly | |
| 2013/0041986 A1 | 2/2013 | Colton et al. | |
| 2013/0091582 A1 | 4/2013 | Chen et al. | |
| 2013/0198607 A1 | 8/2013 | Mischook et al. | |
| 2013/0232234 A1 | 9/2013 | Kapur et al. | |
| 2014/0089786 A1 | 3/2014 | Hashmi | |
| 2014/0189499 A1 | 7/2014 | Gigliotti | |
| 2014/0223290 A1 | 8/2014 | Hathaway | |
| 2014/0281535 A1 | 9/2014 | Kane | |
| 2014/0359571 A1 | 12/2014 | Sasikumar et al. | |
| 2015/0067853 A1 | 3/2015 | Amrutkar | |
| 2016/0028760 A1 | 1/2016 | Yang et al. | |
| 2016/0057111 A1 | 2/2016 | Call et al. | |

FOREIGN PATENT DOCUMENTS

| | | |
|---|---|---|
| WO | WO02/093369 A1 | 11/2002 |
| WO | WO2010046314 A1 | 4/2010 |
| WO | WO2013091709 | 6/2013 |

OTHER PUBLICATIONS

Currie et al., In-the-Wire Authentication: Protecting Client-Side Critical Data Fileds in Secure Network Transactions, dated 2009 2nd International Con. Adapt. Science & Tech. IEEE, pp. 232-237.

European Patent Office, "Search Report" in application No. PCT/US2014/023635, dated Jan. 21, 2015, 11 pages.

Sedaghat et al., "On-The-Fly Web Content Integrity Check Boosts User's Confidence", Communications for the ACM, vol. 45, Issue 11, dated Nov. 2002, 5 pages.

European Patent Office, "Search Report" in application No. PCT/US2015/031361, dated Jul. 28, 2015, 13 pages.

Matsunaka et al., "Detecting and Preventing Drive-By Download Attack via Participative Monitoriing of the Web", Information Security, dated Jul. 26, 2013, 8th Asia Joint Conference, pp. 48-55.

Li et al., "WebShield: Enabling Various Web Defense Techniques Without Client Side Modifications", dated Aug. 15, 2009, 18 pages.

European Patent Office in application No. PCT/US2014/068133, dated Apr. 7, 2015, 14 pages.

Claims in European Application No. PCT/US2014/068133, dated Apr. 2015, 16 pages.

Hofmeyr et al., "Intrusion Detection Using Sequences of Systems", Journal of Computer Security 6, dated Aug. 8, 1998, 30 pages.

International Searching Authority, "Search Report" in application No. PCT/US2015/049024, dated Jan. 19, 2016, 10 pages.

Claims in application No. PCT/US2015/049024, dated Jan. 2016, 8 pages.

U.S. Appl. No. 14/329,718, filed Jul. 11, 2014, Office Action, Mailing Date Feb. 3, 2016.

U.S. Appl. No. 14/099,437, filed Dec. 6, 2013, Notice of Allowability, Mailing Date Jan. 25, 2016.

\* cited by examiner

INTERCEPTING AND SUPERVISING CALLS TO TRANSFORMED OPERATIONS AND OBJECTS

PRIORITY CLAIM

This application claims the benefit under 35 U.S.C. §120 as a Continuation of application Ser. No. 14/159,374, filed Jan. 20, 2014, titled "Intercepting and Supervising Calls to Transformed Operations and Objects", the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to security techniques applicable to client/server systems, and relates more specifically to techniques for determining whether transformed operations and/or objects are successfully transformed and for enforcing use of the transformed operations and/or objects.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer fraud, such as credential stuffing, advanced application denial of service attacks, ratings manipulation, fake account creation, reserving rival goods attacks, ballot stuffing attacks, web site scraping attacks, vulnerability assessments, and stack fingerprinting attacks, is big business for fraudsters. As a specific example, fraud can be perpetrated by obtaining financial or personally identifying information that end users provide while using a browser to communicate with an application server computer. In an exploit commonly termed "Man in the Browser", a user's computer can be infected with malicious code that collects data from legitimate communications, such as communications with the user's bank. After the communications have been decrypted, for example, by a web browser on the user's computer, the malicious code may gather data that is displayed in particular fields or sections in the decrypted web page and provide the data to a malicious user or computer. Malicious code may perform actions on a legitimate user's behalf, using already established trust communication channels and trusted browser environments.

Malicious code may also gather data that is entered by a user before the user's data is encrypted and sent to the intended recipient. For example, a user may enter account information into a web browser that is displaying a web page from the user's bank. The web page may be a login page to access the user's account information and funds. The malicious code may scan particular fields in the web page for the user's account information before the user's account information is encrypted and sent to the user's bank, and then send data obtained from those fields to a malicious user or computer. Web browsers were first developed and deployed in the early 1990's, and thus there has been a need to improve browser security, web server security, web-based application security, and data security at and/or between end points.

SUMMARY

The appended claims may serve as a summary of the invention.

Figure 1:
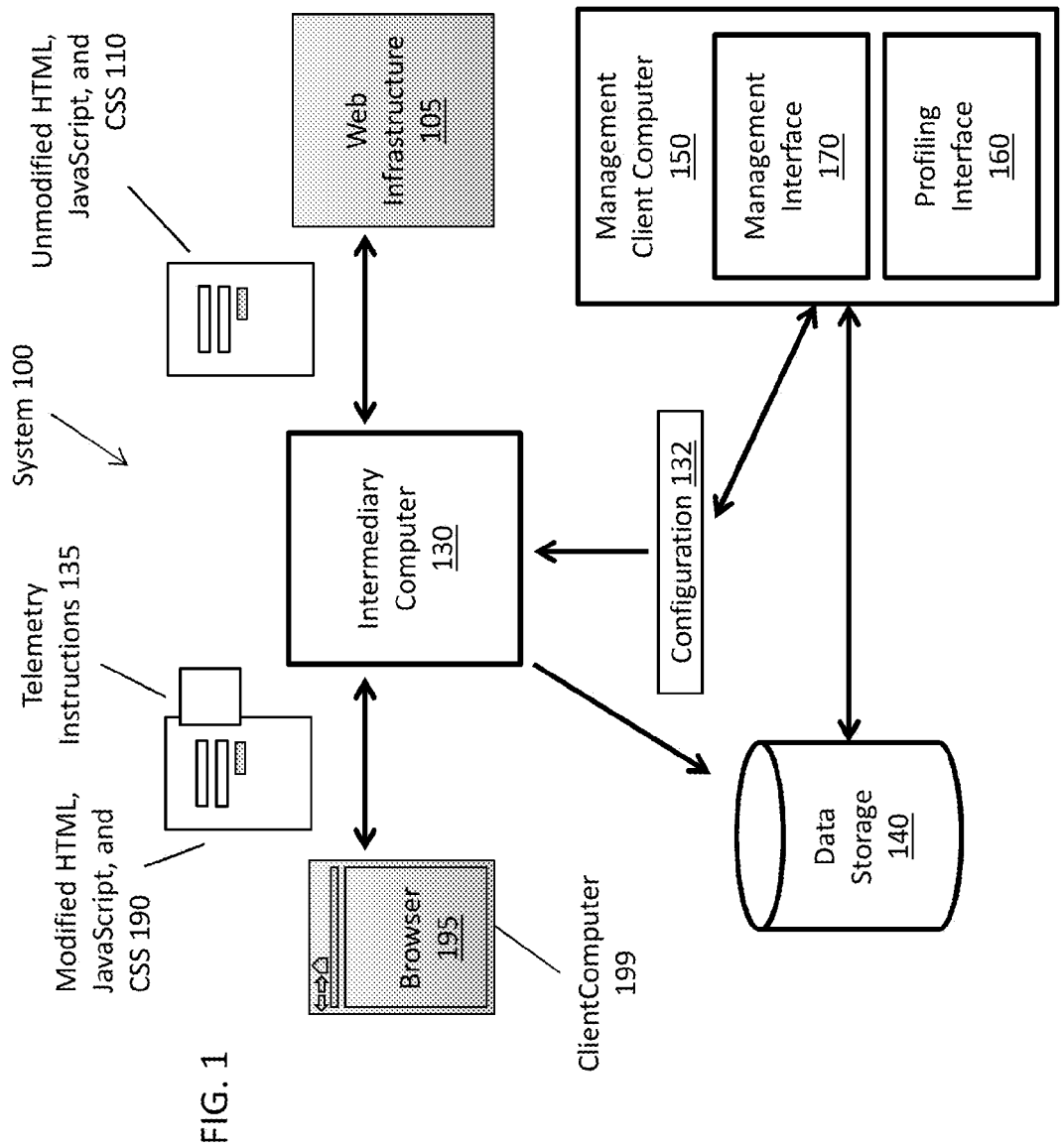
FIG. 1 illustrates a system comprising a server security system, in an example embodiment.

While each of the drawing figures illustrates a particular embodiment for purposes of illustrating a clear example, other embodiments may omit, add to, reorder, and/or modify any of the elements shown in the drawing figures. Furthermore, while the instructions discussed in each example embodiment are HTML and JavaScript instructions, in other embodiments, the instructions intercepted and generated by the intermediary computer need not be HTML and/or JavaScript instructions.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0 Terms
  2.0 General Overview
  3.0 Network Topology
    3.1 Browser
      3.1.1 Browser Frontend
      3.1.2 Supervisor Unit
    3.2 Web Infrastructure
    3.3 Intermediary
      3.3.1 Protocol client module
      3.3.2 Browser Backend
      3.3.3 Forward Transformer
      3.3.4 Protocol server module
      3.3.5 Transaction Store
      3.3.6 Reverse Transformer
      3.3.7 Telemetry Handler 3.4 Management Computer
4.0 Process Overview
    4.1 Mode Processes
        4.1.1 Profiling Mode
        4.1.2 Enforcing Mode
            4.1.2.1 Enforcing Transformed Operations
            4.1.2.2 Enforcing Transformed Object Identifiers
        4.1.3 Compatibility Mode
        4.1.4 Selectively Intercepting Calls
        4.1.5 Updating Calls to Transformed Operations
        4.1.6 Example Process for a Supervisor Unit
    4.2 Adding A Set of Supervisor Operations To A Set Of Instructions
    4.3 Adding a Set of Supervisor Operations to a Set Of Instructions Based On an Updated Configuration
5.0 Implementation Mechanisms—Hardware Overview
6.0 Other Aspects of Disclosure
1.0 Terms In certain embodiments:

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

An "object" may be a data structure that can be identified by an identifier and/or a relationship with another object. For example, an object may have a unique identifier that is a string, such as a name, customer number, or username. Accordingly, the object may be referenced and/or retrieved using the identifier. Also for example, if a particular object is the first child object of a parent object, then the particular object may be referenced and/or retrieved using a pointer to the parent object and then retrieving a pointer to the first child object. A browser and/or runtime environment may provide one or more Application Programming Interfaces ("APIs") for referencing and/or retrieving objects within a Document Object Model ("DOM"). The one or more APIs may allow a user to reference and/or retrieve an object by unique identifier, and/or a relative and/or absolute location in a DOM. Selector APIs and XPaths are two examples of APIs that may be available in a browser to reference and/or retrieve objects within a DOM. An object may be a particular type of object. For example, one object may be a button, another object may be an input, or specifically a text field, and another object may be an image.

An "attribute" may be data that identifies and/or describes the appearance, behavior, and/or content of an object. For example, an attribute may be a unique identifier, such as a name. An attribute may indicate that an object is a type of text field, text area, checkbox, and/or radio button. An attribute may indicate that an object is a type of password text field; accordingly, a client application rendering the text field object on a monitor need not cause the characters that are entered into the field object to be displayed. An attribute associated with the text field object may be updated to include the value entered in the text field. Other attributes may define or describe dimension, position, color, visibility, value, and any other functional or visual aspect of an object.

A "document object model" ("DOM") may be a cross-platform and language-independent representation of one or more objects that are interrelated. For example, a DOM may represent one or more objects in an object tree and/or hierarchy. An object within the hierarchy may be a parent object, which has one or more child objects. A child object may also have one or more child objects.

"Creating, updating, and/or removing an object" or "operating on an object" may mean creating, updating, and/or removing a data structure in memory that represents an object, an object's attributes, and/or relationships between an object and one or more other objects. Additionally, "operating on an object" may mean performing one or more operations that use an object, attribute, and/or relationship between an object and one or more other objects as input. Because these processes directly or indirectly involve changing the state of registers or other structures in electronic digital memory circuits, the processes necessarily involve using a computer to transform the state of tangible things.

An "operation" may be any function, method, script, and/or any other code, which when executed operates on an object. In an embodiment, operations may be objects, and therefore, for purposes of brevity, an "operation" may mean an operation or object.

A "base operation" may mean an operation that is defined by a runtime environment or common library. For example, the DOM API method commonly aliased as getElementById may be a base operation, since the method frequently defined in modern JavaScript runtime environments in some embodiments.

"Instructions" may mean one or more codes that define one or more objects and/or one or more operations. For example, instructions may comprise HyperText Markup Language ("HTML"), eXtensible Markup Language ("XML"), cascading style sheets ("CSS"), JavaScript, and/or any other standard or proprietary languages or codes that define objects, attributes, relationships between objects, and/or operations.

"Performing instructions" or "executing instructions" may mean creating one or more objects and/or performing one or more operations defined by the instructions.

A "runtime environment" may mean a software or hardware layer that implements the core behavior and/or base operations of a programming language. For example, a JavaScript runtime environment may implement the core behavior and/or base operations of the JavaScript programming language. Additionally, the runtime environment may maintain data structures in memory that are defined in a program written in the programming language. Because these processes directly or indirectly involve changing the state of registers or other structures in electronic digital memory circuits, the processes necessarily involve using a computer to transform the state of tangible things.

"Data" may mean any data and/or instructions in electronic digital memory.

An "attribute map" may be a map from one attribute name and/or value to one or more other names and/or values. For example, assume an object has an attribute, "id", which defines a unique identifier: "MyObject". An attribute map may associate "MyObject" with a different unique identifier, such as "MySecureObject". Additionally, an attribute map may be used to map a modified attribute name and/or value to an original name and/or value. An attribute map may be an operation, hash map, and/or any other method or associative data structure.

A "DOM map" may be a map from a first DOM to a second, different DOM. For example, a DOM map may be a collection of attribute maps. Each attribute map in the DOM map may be an attribute map for an attribute of an object in a first DOM with a modified attribute in a second DOM. Additionally or alternatively, a DOM map may map one hierarchy to another, different hierarchy, and back again. For example, a DOM map may modify a relationship between a first object and a second object, such that a first object is not related to a second object in a first DOM, and the first object is a parent object to the second object in the second DOM.

A "browser" may be one or more computer programs or other software elements stored in electronic digital memory and running on a computer that receives instructions from a server computer, performs one or more of the received instructions, causes to display content, provides a user interface ("UI") to receive user inputs, and/or receives and responds to one or more inputs from a user based on or according to the one or more performed instructions. A browser and/or components of a browser may be implemented into an application. For example, a browser and/or components of a browser may be implemented into a standalone, web-based, and/or mobile application as part of a web view, and/or web view controller, to send and/or receive data over HTTP and/or other protocol. A user may use a browser to send data to a server computer. The server computer may respond with additional instructions.

A "headless browser" may be a browser that does not cause visually displaying or rendering graphical images of objects that are defined in a set of received instructions according to the received set of instructions. Additionally or alternatively, a "headless browser" may be a browser that does not respond to user inputs according to a set of received instructions. Additionally or alternatively, a "headless browser" may simulate user actions, such as scrolling clicking a button, and/or selecting an element.

"Sending and/or receiving data over HTTP" may mean sending and/or receiving data and/or instructions using HyperText Transfer Protocol. Additionally or alternatively, "sending and/or receiving data over HTTP" may mean sending and/or receiving data and/or instructions using HTTP on top of another protocol, such as Secure Socket Layer and/or Transport Layer Security ("SSL/TLS") protocols, which add security capabilities to HTTP messages, and is commonly known as HTTP Secure ("HTTPS"). Additionally or alternatively, one or more other protocols may be used, such as SPDY.

A "web browser" may be a browser that sends and/or receives data over HTTP. For example, a web browser may receive instructions comprising HTML, CSS, and/or JavaScript over HTTP.

A "supervisor operation" may be an operation that monitors, reports on, and/or regulates use of one or more objects, operations, and/or operations that reference one or more objects. For example, a supervisor operation may monitor, enforce, and/or report how one or more operations reference objects in a DOM, whether transformed objects and/or operations are transformed correctly, whether calls to original objects and/or operations are still made despite having been replaced with transformed objects and/or operations.

A "supervisor unit" may be a set of supervisor operations in a layer that is positioned logically between a browser, and/or runtime environment of a browser, and the content loaded and/or executed within the browser, such as objects within a DOM and/or one or more operations that operate on objects in the DOM. A supervisor unit may be implemented as a set of one or more supervisor operations. Instrumentations to monitor, enforce, and/or provide feedback about a set of supervisor operations are further discussed in detail herein.

"Supervisor unit instructions" or "supervisor instructions" may be instructions that define and/or implement one or more supervisor operations. Additionally, "supervisor unit instructions" or "supervisor instructions" may be instructions, which when executed generate and/or implement a supervisor unit.

"Adding supervisor operations", or "adding a supervisor unit", to a set of instructions may mean adding supervisor instructions to another set of instructions. For example, an intermediary computer may intercept instructions from a web server, add instructions for a supervisor unit, modify the intercepted instructions, and send the modified instructions, which include the instructions that define one or more supervisor operations, to the intended client recipient.

"Telemetry data" may mean any data generated and/or related to the operations of a supervisor unit. Additionally or alternatively, telemetry data may mean data that describes which operation(s) were called, what parameters were passed, the call stack that led up to the called operation(s), which object(s) were referenced, and/or any other information regarding the state of a runtime environment or the supervisor unit.

A "transformed operation" and/or a "transformed object" may mean an operation and/or object that has been modified based on any real-time polymorphic method. For example, assume an alias for an operation is "document.getElementByld". The transformed operation may have a different alias, such as "document.getSecureObjectByld". Also, for example, assume an object has an attribute, "id", which defines a unique identifier: "MyObject". The transformed object may have a different unique identifier, such as "MySecureObject". Additionally or alternatively, new functionality may be added to a transformed operation and/or object. Additionally or alternatively, functionally may be removed from a transformed operation and/or object.

A "page" or "web page" may be a set of instructions that define one or more objects and/or operations that may be executed concurrently and may be visually displayed together. For example, in response to a request from a client computer, a "home page" may be sent to the client computer. The home page may be a set of instructions that a web server sends to a remote client computer if no parameters are included in the request.

A "bot" may mean a computer and/or software executed by a computer that automates sending and/or receiving data. For example, a bot may be a web scraper, web crawler, automatic web browser, headless browser, and/or any other tool designed to submit and/or receive data from one or more web servers. A bot may comprise complex logic designed to respond to data received from one or more web servers.

2.0 General Overview

Modifying instructions sent from a server to a browser may prevent, and/or reduce the effectiveness of, one or more various attacks, such as a denial of service ("DOS") attack, credential stuffing, fake account creation, ratings or results manipulation, man in the browser attacks, reserving rival goods or services, scanning for vulnerabilities, and/or exploitation of vulnerabilities. For example, each time a web page is requested, such as an account creation page, order page, voting page, and/or other page from a web server computer, an intermediary computer may intercept the instructions sent from the web server. The intermediary may transform the operations and/or objects in the original set of instructions to produce a new set of instructions. The intermediary may send the new set of instructions to the browser that requested the web page.

Each time the intermediary intercepts instructions from the server, the intermediary may generate new, different instructions to send to the browser. Thus, a bot requesting the same page over and over may receive a different set of instructions after each request and may not observe the same one or more operations and/or objects twice. Without receiving the same one or more operation aliases and/or identifiers, the bot may be incapable of determining what data should be entered in and/or associated with each field to collect data, create a fake account, order and/or reserve one or more goods or services, vote, add malicious SQL, and/or submit any other malicious content.

To manage the new set of instructions including detecting potential operational changes that are introduced, the intermediary may include a set of supervisor operations in the new set of instructions. The set of supervisor operations may intercept calls to one or more operations and/or objects. In response to intercepting a call, the set of supervisor operations may determine whether the call is allowed, report telemetry data indicating that the call was made and which operation(s) and/or object(s) were referenced, modify the call, report the call, and/or block the call. The features of the set of supervisor operations are discussed in detail herein.

An administrator may configure the set of supervisor operations for each operation, object, web page, and/or web site to which the set of supervisor operations is added. For example, based on telemetry data received from previous supervisor operations, an administrator may instruct the intermediary to generate a set of supervisor operations that imposes one or more modes on one or more operations and/or objects within a page. In an embodiment, a mode may prohibit calls that reference an original operation and/or object. Additionally, the mode may allow calls that reference a corresponding transformed operation and/or object. Another mode may allow calls to an original operation and/or object, but may report whether a corresponding, transformed operation and/or object returns the same result.

In an embodiment, a method comprises intercepting a first set of instructions received from a server computer that define one or more objects and one or more original operations that are based, at least in part, on the one or more objects; modifying the first set of instructions by adding one or more supervisor operations that are based, at least in part, on the one or more objects; transforming the one or more original operations to produce one or more transformed operations that are based, at least in part, on the one or more supervisor operations; rendering a second set of instructions which define the one or more supervisor operations and the one or more transformed operations; sending the second set of instructions to a remote client computer.

In an embodiment, wherein each object of the one or more objects includes an original identifier, the method comprises transforming the original identifier for each object, of the one or more objects, to produce to a corresponding transformed identifier; updating each object of the one or more objects to include the corresponding transformed identifier; modifying the first set of instructions to include the one or more supervisor operations, which reference the one or more objects by the corresponding transformed identifier for each object; rendering the second set of instructions which define the one or more original operations and the one or more objects.

In an embodiment, the method comprises transforming an original identifier that is included in each object, of the one or more objects, to produce to a corresponding transformed identifier; updating each object of the one or more objects to include the corresponding transformed identifier; modifying the first set of instructions to include the one or more supervisor operations, which when executed in a runtime environment, cause: intercepting a call to an operation; determining the operation references a particular object by a particular transformed identifier; terminating the call without performing the operation; rendering the second set of instructions which define the one or more objects.

In an embodiment, the one or more supervisor operations, which when executed in a runtime environment, cause intercepting a call to an operation; sending, to an intermediary computer, a set of telemetry data indicating that the call to the operation was made; performing the operation; receiving, from the remote client computer, the set of telemetry data; storing, in a database, profiling data indicating that the call to the operation was made.

In an embodiment, a method comprises intercepting, from a web server computer, over HTTP, an original HTML document and a set of original JavaScript instructions that define one or more objects in an original DOM and one or more original JavaScript methods that are based, at least in part, on the one or more objects; injecting one or more supervisor JavaScript methods that are based, at least in part, on the one or more objects; transforming the one or more original JavaScript methods to produce one or more transformed JavaScript methods that are based, at least in part, on the one or more supervisor JavaScript methods; rendering a new HTML document and a new set of JavaScript instructions which define the one or more supervisor JavaScript methods, and the one or more transformed JavaScript methods; sending the new HTML document and the new set of JavaScript instructions to a remote client computer.

3.0 Example Network Topology

FIG. 1 illustrates a system comprising a server security system, in an example embodiment. System 100 includes web infrastructure 105, client computer 199, intermediary computer 130, data store 140, and management computer 150 distributed across a plurality of interconnected networks. While each of the components listed above are illustrated as if running on a separate, remote computer from each other, one or more of the components listed above may be part of and/or executed on the same computer. For example, HTTP intermediary computer 130, data store 140, web infrastructure 105, and/or management computer 150 may be executed on the same computer, local area, and/or wide area network. Additionally or alternatively, intermediary computer 130 is a proxy server for web infrastructure 105. Additionally or alternatively, intermediary computer 130 may be physically and/or logically between a router and web infrastructure 105, such that all network data sent to, and/or sent from, web infrastructure 105 over one or more protocols may be intercepted by intermediary computer 130.

3.1 Browser

Figure 3:
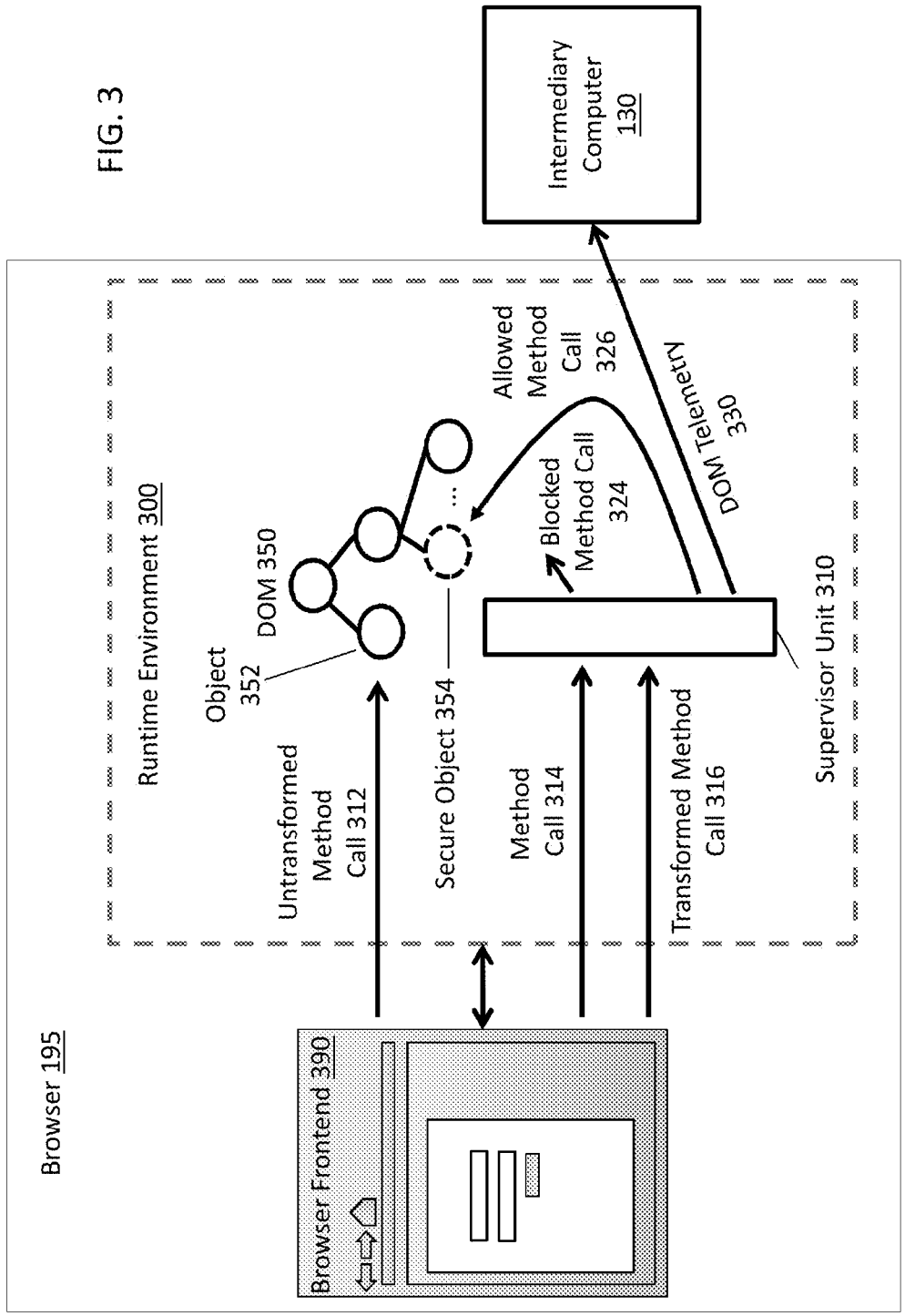
FIG. 3 illustrates a more detailed view of a web browser, in an example embodiment.

Browser 195 may be a browser that is executed on client computer 199 and operated by a user using client computer 199. For example, browser 195 may be a web browser that is configured to request data from web infrastructure 105, and receive and execute HTML, CSS, and/or JavaScript. FIG. 3 illustrates a more detailed view of a web browser, in an example embodiment. While browser 195 may be described in more detail in FIG. 3, using the particular arrangement illustrated in FIG. 3 is not required in other embodiments. Referring now to FIG. 3, browser 195 includes runtime environment 300 and browser frontend 390. Runtime environment 300 may execute and maintain supervisor unit 310 and DOM 350.

3.1.1 Browser Frontend

Browser frontend 390 may cause one or more objects to be presented and/or updated visually and/or audibly to a user using client computer 199. Browser frontend 390 may receive one or more inputs. For example, in response to a user pressing a particular button on a mouse or keyboard coupled to client computer 199, browser frontend 390 may receive data from the operating system running on client computer 199 indicating that a user pressed the particular button.

Browser frontend 390 and runtime environment 300 may be communicatively coupled. For example, in response to receiving the data from the operating system, browser frontend 390 may call an operation, or cause an operation to be called, such as untransformed method call 312, method call 314, and/or transformed method call 316. One or more of the calls may be intercepted by supervisor unit 310. If an operation is executed, which operates on one or more objects in DOM 350, then browser frontend 390 may update the user interface accordingly.

3.1.2 Supervisor Unit

Supervisor unit 310 manages calls to one or more operations and/or objects that operate on and/or reference one or more objects in DOM 350, such as object 352 and secure object 354. Additionally or alternatively, supervisor unit 310 may log and/or send telemetry data describing which operation(s) were called, what parameters were passed, the call stack that led up to the called operation(s), which object(s) were referenced, and/or any other information regarding the state of runtime environment 300 or the supervisor unit. For purposes of illustrating clear examples and for convenience, the supervisor unit 310 may represent, in the form of a single functional unit, a set of one or more supervisor operations.

Supervisor unit 310 may manage execution of each operation in one or more modes, such as compatibility mode, profiling mode, and/or enforcing mode. Each mode may be applied to one or more operations independently. For example, supervisor unit 310 may manage the execution of a first operation in compatibility mode, a second operation in profiling mode, a third operation in enforcing mode, and a forth operation in compatibility mode and profiling mode. However, supervisor unit 310 need not manage execution of a fifth operation. Each mode is discussed in detail herein.

3.2 Web Infrastructure

Returning to FIG. 1, web infrastructure 105 may be one or more server computers that receive requests for data from users, such as a user using browser 195, through intermediary computer 130. In response, web infrastructure 105 may send data to browser 195, through intermediary computer 130. As illustrated in FIG. 1 the data sent from web infrastructure 205 may include instructions: HTML, JavaScript, and CSS 110.

Figure 2:
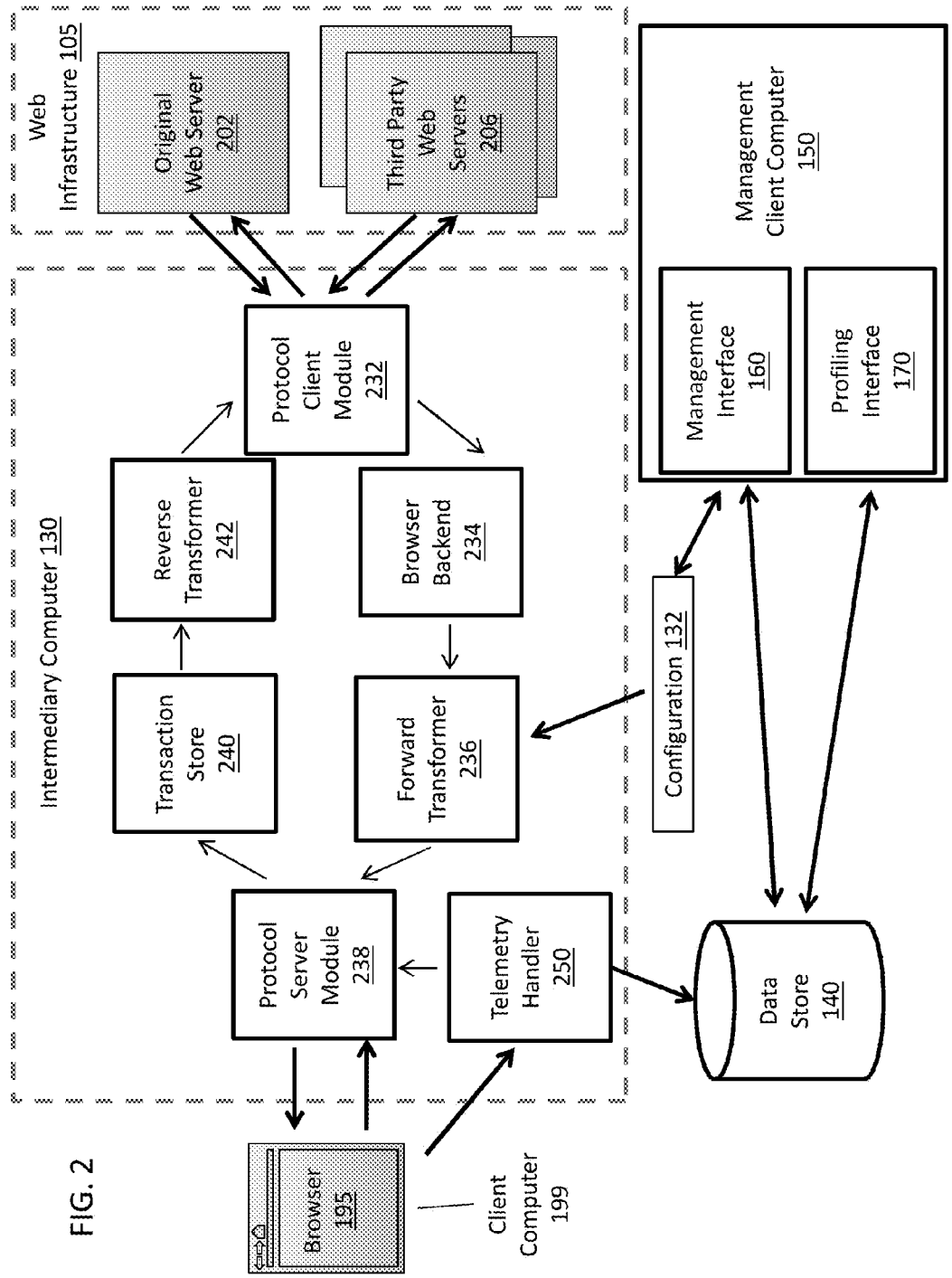
FIG. 2 illustrates a web infrastructure in an example embodiment.

FIG. 2 illustrates a web infrastructure in an example embodiment. The web infrastructure 105 may be described with reference to original web server computer 202 and third party web server computers 206 in FIG. 2, but using the particular arrangement illustrated in FIG. 2 is not required in other embodiments.

Original web server computer 202 may be a server computer that receives requests for data and responds with data. For example, original web server computer 202 may be an HTTP-based web server that receives HTTP requests and responds with data comprising HTML, CSS, and/or JavaScript instructions. Additionally or alternatively, original web server computer 202 may respond with data that references additional data on other server computers, such as third party web server computers 206.

Third party web server computers 206 may be one or more server computers that store additional data referenced by instructions sent from original web server computer 202. For example, data from original web server computer 202 may include a reference to a JavaScript file stored on third party web server computers 206. Accordingly, a browser, or a browser backend, may request the referenced JavaScript file from third party web server computers 206. Also for example, data from original web server computer 202 may include a reference to an image stored on third party web server computers 206. Accordingly, a browser may request the referenced image from third party web server computers 206.

3.3 Intermediary

Returning now to FIG. 1, intermediary computer 130 may intercept instructions sent from web infrastructure 105, generate new instructions, add supervisor instructions, and send the new instructions to browser 195. For example, intermediary computer 130 may intercept HTML, JavaScript, and CSS 110, add supervisor instructions 135 to implement a set of supervisor operations, generate HTML, JavaScript, and CSS 190 (which may be different than HTML, JavaScript, and CSS 110), and send HTML, JavaScript, CSS 190, and supervisor instructions 135 to browser 195. Additionally, intermediary computer 130 may intercept a request from browser 195, generate a new, modified request, and send the new, modified request to web infrastructure 105.

In FIG. 2, intermediary computer 130 may be an HTTP intermediary that intercepts and modifies HTML, JavaScript, CSS, and HTTP requests for HTTP web browsers. However, intermediary computer 230 may be an intermediary for any other standard and/or proprietary protocol. Intermediary computer 130 may also add supervisor instructions to the modified HTML, JavaScript, and/or CSS. Furthermore, each of the components discussed, which intermediary computer 130 is comprised of, may be configured to perform any of the processes and/or methods discussed herein for any standard and/or proprietary protocol.

Intermediary computer 130 may be a server computer that is located on the same network as web infrastructure 105. Additionally or alternatively, intermediary computer 130 may be topologically located between a public-facing router and web infrastructure 105, logically and/or physically. Accordingly, requests from browser 195 to web infrastructure 105 may be passed through and/or modified by intermediary computer 130. Furthermore, instructions from web infrastructure 105 to browser 195 may be passed through and/or modified by intermediary computer 130.

FIG. 2 illustrates, among other things, a more detailed view of intermediary computer 130, in an example embodiment. The intermediary computer 130 may be described with reference to several components illustrated in FIG. 2 and discussed in detail below, but using the particular arrangement illustrated in FIG. 3 is not required in other embodiments. Turning now to FIG. 2, intermediary computer 130 may comprise protocol client module 232, browser backend 234, forward transformer 236, protocol server module 238, transaction store 240, reverse transformer 242, and telemetry handler 250. In an embodiment, each of the functional units of intermediary computer 130 may be implemented using any of the techniques further described herein in connection with FIG. 7; for example, the intermediary computer may comprise a general-purpose computer configured with one or more stored programs which when executed cause performing the functions described herein for the intermediary computer, or a special-purpose computer with digital logic that is configured to execute the functions, or digital logic that is used in other computing devices.

3.3.1 Protocol Client Module

Protocol client module 232 may intercept data over any standard or proprietary protocol. For example, protocol client module 232 may intercept data over HTTP. Accordingly, protocol client module 232 may be communicatively coupled with web infrastructure 105, original web server computer 202, and third party web server computers 206.

3.3.2 Browser Backend

Browser backend 234 may be an HTTP-based headless browser. Additionally or alternatively, browser backend 234 may be a headless browser based on one or more other standard and/or proprietary protocols. Browser backend 234 may make requests for additional data. For example, if instructions received from protocol client module 232 reference additional instructions stored on a third party web server, browser backend 234 may request the additional instructions through protocol client module 232.

Browser backend 234 may perform and/or parse one or more instructions intercepted by protocol client module 232. After performing and/or parsing the instructions, browser backend 234 may notify forward transformer 236 to begin generating new instructions based on the objects and/or operations that are currently in memory. Browser backend 234 may generate and/or store the objects and/or operations in memory by parsing the one or more instructions intercepted by protocol client module 232. Additionally or alternatively, browser backend 234 may be a headless browser that may generate and/or store the object and/or operations in memory by executing at least a portion of the one or more instructions intercepted by protocol client module 232.

3.3.3 Forward Transformer

Forward transformer 236 may operate on the objects and/or operations created by browser backend 234, generate one or more attribute maps and/or DOM maps, render a new set of instructions based on the one or more operations and/or objects in memory, and add supervisor instructions to the rendered instructions, based on one or more configurations specified in configuration 132. For example, browser backend 234 may modify the objects and/or operations in memory according to one or more real-time polymorphic methods: modifying one or more object identifiers, attribute, or relationship(s) with one or more other objects. Forward transformer 336 may send the rendered instructions to protocol server module 338. Forward transformer 336 may send the attribute maps and/or DOM maps to transaction store 240.

The supervisor instructions added need not be same supervisor instructions for each set of instructions rendered. For example, if configuration 132 indicates that a set of supervisor operations should profile a particular page, then forward transformer 236 may add supervisor instructions, which when executed, send telemetry data to intermediary computer 130. However, if configuration 132 changes and now indicates that the added set of supervisor operations should enforce transformations in the particular page, then forward transformer 236 may add different supervisor instructions, which when executed, prevent calls to non-transformed operations from being executed.

3.3.4 Protocol Server Module

Protocol server module 238 may receive the instructions generated by forward transformer 236 and send the generated instructions to browser 195. Additionally or alternatively, protocol server module 238 may intercept requests from browser 195 and forward the requests to transaction store 240.

3.3.5 Transaction Store

Transaction store 240 may receive requests intercepted by protocol server module 238 from browser 195. Transaction store 240 may retrieve one or more attribute maps and/or DOM maps, based on data in the request, and forward the request with the retrieved one or more attribute maps and/or DOM maps to reverse transformer 242. Accordingly, transaction store 240 may be communicatively coupled with reverse transformer 242.

3.3.6 Reverse Transformer

Reverse transformer 242 may transform requests intercepted by protocol server module 238, which are based on instructions generated by forward transformer 236, into requests that would have been generated by browser 195 had browser 195 received the original instructions sent from original web server computer 202. Reverse transformer 242 may transform requests based on the one or more attribute maps and/or DOM maps retrieved by transaction store 240. Reverse transformer 242 may send the transformed request to original web server computer 202 through protocol client module 232.

3.3.7 Telemetry Handler

Telemetry handler 250 may receive telemetry data from browser 195. Telemetry handler 250 may store the telemetry data, or data derived from the telemetry data, in data store 140. For example, telemetry handler 250 may receive telemetry data that transformed method 316 was called, and that an object identifier was correctly derived when the modified method was executed.

3.4 Management Computer

Returning now to FIG. 1, a user, such as an administrator for web infrastructure 105, may use management computer 150 to retrieve data from data store 140. For example, management computer 150 may display profiling data stored in data store 140 through profiling interface 160. Profiling interface 160 may present profiling data in data store 140 to help an administrator determine whether intermediary computer 130 is successfully transforming one or more operations, which are defined in one or more pages, on one or more sites.

Management interface 170 may present data indicating the current mode(s) a supervisor unit is implementing for one or more operations, defined in one or more pages, on one or more sites, as defined in configuration 132. Management interface 170 may also provide controls for a user to change the mode(s) a supervisor unit should impose on one or more operations for each page and/or site. Thus, a user, through management computer 150, may modify configuration 132 based on the profiling data displayed. Intermediary computer 130 may update the behavior of the added set of supervisor operations based on modified configuration 132.

While profiling interface 160 and management interface 170 and are illustration as if separate interfaces, management interface 170 and profiling interface 160 may be the same interface. For example, a single interface may display whether a transformed operation was correctly transformed. The single interface may also present controls to change the mode implemented by the set of supervisor operations for the transformed operation. Accordingly, in an embodiment, profiling interface 160 and management interface 170 are the same interface. For example, management computer 150 may cause profiling data to be displayed, which indicates that a particular operation is transformed correctly 100% of the time for a particular web page. Management computer 150 may also cause to display a button near the profiling data, which when selected causes configuration 132 to be updated to indicate that the set of supervisor operations added to the particular web page should use enforcement mode for the particular operation.

4.0 Modes and Mode Processes

In an embodiment, a data processing method may be configured to intercept the instructions associated with a web page from a server computer and generate new, different instructions based on the intercepted instructions, and add a set of supervisor operations. In an embodiment, a data processing method may be configured to add a new, different set of supervisor operations than a previously generated set of supervisor operations, based on a configuration that assigns a mode globally and/or specifically to one or more operations on one or more pages and/or sites. For purposes of illustrating clear example, embodiments discussed herein may send and/or receive HTML and/or JavaScript instructions over HTTP. However, in other embodiments, the methods and processes discussed herein my use other standard and/or proprietary instructions over other standard and/or proprietary protocol(s).

4.1 Mode Processes

To illustrate clear examples of various modes in a set of supervisor operations, program code snippets are provided herein according an example embodiment. However, other embodiments need not use these specific snippets. Furthermore, each snippet may be discussed with reference to FIG. 3, however the particular embodiment illustrated in FIG. 3 is not required in other embodiments.

4.1.1 Profiling Mode

In profiling mode, a set of supervisor operations may report calls made to one or more operations. For example, a set of supervisor operations may send and/or store telemetry data, which may comprise information about one or more calls to one or more operations, to an intermediary server computer and/or other data store. An administrator may review the telemetry data and determine, going forward, whether the set of supervisor operations should switch to enforcing mode or compatibility mode for one or more operations. In profiling mode, a set of supervisor operations need not prevent the originally called method from being performed.

Snippet 1 is an example set of instructions written in JavaScript for a set of supervisor operations, which when executed by a JavaScript runtime environment, in an embodiment, intercepts a call to an operation in profiling mode.

Snippet 1:

```
line 1: var allowed_method326 = method314;
line 2: var method314 = function(objectID){
line 3:      sendTelemetry(["method314", objectID]);
line 4:      allowed_method326(objectID);
line 5: };
```

In line 1 of Snippet 1, an original method, which is originally aliased as "method314" is assigned a new alias: "allowed_method326". Thus, after line 1 is parsed and/or executed, the original method may be called using the new alias.

In line 2, the original alias, "method314", is set as an alias for a new method defined in lines 2 through 5. Thus, after lines 2 through 5 are parsed and/or executed, the new method may be called using the original method's original alias: "method314". Supervisor unit 310 may intercept calls, such as method call 314, which was called to invoke the original method. In response, supervisor unit 310 may perform the new method currently aliased as "method314".

In response to intercepting method call 314, supervisor unit 310 may cause line 3 and line 4 to be executed. In line 3, telemetry data is sent to the server, which describes the call that was made and which object identifier was used. For example, supervisor unit 310 may send DOM telemetry 330 to intermediary computer 130. In line 4, the original method is called with allowed method call 326, using the new alias: "allowed_method326". Thus, supervisor unit 310 intercepts method call 314, sends telemetry data to intermediary computer 130, and then executes the original method.

4.1.2 Enforcing Mode

In enforcing mode, a set of supervisor operations may block calls to untransformed operations. Additionally or alternatively, in enforcing mode, a set of supervisor operations may block a call to an original operation if one or more objects and/or object identifiers referenced by the operation or the call are not transformed.

4.1.2.1 Enforcing Transformed Operations

Snippet 2 is an example set of instructions written in JavaScript for a set of supervisor operations, which when executed by a JavaScript runtime environment in an embodiment blocks calls to untransformed operations.

Snippet 2:

```
line 1: var allowed_method326 = method314;
line 2: var method314 = function(objectID){
line 3:      blocked_method324("malware detected");
line 4: };
line 5: var transformed_method314(objectID) {
line 6:      allowed_method326(objectID);
line 7: }
```

In line 1 of Snippet 2, an original method, which is originally aliased as "method314" is assigned a new alias: "allowed_method326". Thus, after line 1 is parsed and/or executed, the original method may be called using the new alias.

In line 2, the original alias, "method314", is set as an alias for a first new method defined in lines 2 through 4. Thus, after lines 2 through 4 are parsed and/or executed, the first new method may be called using the original method's original alias: "method314". Supervisor unit 310 may intercept calls, such as method call 314, which was called to invoke the original method. In response, supervisor unit 310 may perform the first new method currently aliased as "method314", which blocks the original method from being called.

In response to intercepting method call 314, supervisor unit 310 may cause line 3 to be executed. In line 3, supervisor unit 310 calls a blocking method: "blocked_method324". The blocking method may return control to the caller. Additionally or alternatively, the blocking method may cause an alert to be shown, an exception to be raised, telemetry data to be sent, and/or any other method or operation to warn the user or an administrator of the intermediary computer or web infrastructure.

No instruction is included in the first new method to call the original method using the new alias: "allowed_method314". Thus, supervisor unit 310 may intercept method call 314, and block the original method currently aliased as "allowed_method326" from being executed when the "method314" alias is used.

In line 5, a new alias, "transformed_method314", is set as an alias for a second new method defined in lines 5 through 7. Thus, after lines 5 through 7 are parsed and/or executed, the second new method may be called using the new alias: "transformed_method314". Supervisor unit 310 may intercept calls, such as transformed method call 316, which was inserted by intermediary computer 130. In response, supervisor unit 310 may perform the second new method, aliased as "transformed_method314", issuing allowed method call 326. Allowed method call 326 may cause the original method, aliased as "allowed_method326", to be called.

4.1.2.2 Enforcing Transformed Object Identifiers

Supervisor unit 310 may use enforcing mode to block calls to transformed operations in other embodiments. For example, Snippet 3 is an example set of instructions written in JavaScript for a set of supervisor operations, which when executed by a JavaScript runtime environment in an embodiment, blocks calls that reference one or more objects that are not transformed.

Snippet 3:

```
line 1: var allowed_method326 = method314;
line 2: var method314 = function(objectID) {
line 3:         if(isObjectTransformed(objectID))
line 4:                 blocked_method324("malware detected");
line 5:         else
line 6:                 allowed_method326(objectID);
line 7: };
```

In line 1 of Snippet 3, an original method, which is originally aliased as "method314" is assigned a new alias: "allowed_method326". Thus, after line 1 is parsed and/or executed, the original method may be called using the new alias.

In line 2, the original alias, "method314", is set as an alias for a new method defined in lines 2 through 7. Thus, after lines 2 through 7 are parsed and/or executed, the new method may be called using the original method's original alias: "method314". Supervisor unit 310 may intercept calls, such as method call 314, which was called to invoke the original method. In response, supervisor unit 310 may perform the new method currently aliased as "method314", which prevents the original method from being called if the identifier stored in objectID is not a transformed object; otherwise, the original method is executed with the transformed identifier stored in objectID.

In response to intercepting method call 314, supervisor unit 310 may cause line 3 to be executed. In line 3, a method is called that determines whether the object passed to the method, is a transformed object, or if the object identifier passed to the method is a transformed object identifier. Determining whether an identifier is a transformed identifier may be based on one or more methods. For example, a table of transformed object identifiers may be maintained; if the object identifier is found in the table, then the object identifier is a transformed identifier. Additionally or alternatively, a list of original object identifiers that have been transformed may be maintained; if the object identifier is found in the table, then the object identifier is not a transformed identifier. Additionally or alternatively, the identifier may contain data or labels that indicate it is a transformed identifier. For example, if the object identifier includes the string "secure", then the identifier may be determined to be a transformed identifier.

If, in line 3, the object identifier is determined to not be a transformed identifier, then control proceeds to line 4 and supervisor unit 310 calls a blocking method: "blocked_method324". For purposes of illustrating a clear example, assume that the identifier stored in variable objectID includes the original identifier, "354" to secure object 354. Accordingly, supervisor unit 310 calls a blocking method: "blocked_method324".

If, in line 3, the object identifier is determined to be a transformed identifier, such as "secure object 354", then control proceeds to line 6 and supervisor unit 310 may make allowed method call 326, which calls the original method, using the new alias: "allowed_method326", which operates on secure object 354.

4.1.3 Compatibility Mode

In compatibility mode, a set of supervisor operations may allow original operations to be executed regardless of whether the called operation has an alternate, transformed alias or references one or more original or transformed object identifiers. For example, a set of supervisor operations in compatibility mode may report the results of a transformed method against the results of the corresponding original method to determine whether the transformed method is transformed correctly. The results, or the result of the comparison, may be sent to intermediary computer 130 as DOM telemetry data 330.

Snippet 4 is an example set of instructions written in JavaScript for a set of supervisor operations, which when executed by a JavaScript runtime environment in an embodiment, intercepts a call to an operation in compatibility mode. For purposes of illustrating a clear example, assume that "some_new_method" is an alias for a new method that was added by intermediary computer 130, which is supposed to be a transformation of the original method, originally aliased as "method314".

Snippet 4:

```
line 1: var untransformed_method314 = method314;
line 2: var transformed_method314 = function(objectID){
line 3:         return some_new_method(objectID);
line 4: };
line 5: var test_transformed_method314 =
        function(objectID) {
line 6:         var v1 = untransformed_method312(objectID);
line 7:         var v2 = transformed_method316(objectID);
line 8:         if (v1.compare(v2)) {
line 9:                 sendTelemetry(["transformed_method316",
        objectID, "success"]);
line 10:        else {
line 11:
                sendTelemetry(["transformed_method316",
        objectID, "failed"]);
line 12:                }
line 13:        };
```

In line 1 of Snippet 4, an original method, which is originally aliased as "method314" is assigned a first new alias: "untransformed_method314". Thus, after line 1 is parsed and/or executed, the original method may be called using the first new alias: "untransformed_method314".

In line 2, a second new alias, "transformed_method314", is set as an alias for a first new method defined in lines 2 through 4. Thus, after lines 2 through 4 are parsed and/or executed, the first new method may be called using the second new alias: "transformed_method314". Upon receiving a call for the first new method, line 3 is executed, which calls a new method, which is expected to return the same value as original method.

In line 5, a new alias, "test_transformed_method314", is set as an alias for a second new method defined in lines 5 through 13. Thus, after lines 5 through 13 are parsed and/or executed, the second new method may be called using the new alias: "test_transformed_method314". In line 6, the original, untransformed method is called and the resulting value is stored in a variable v1. In line 7, the transformed method is called and the resulting value is stored in variable v2. In line 8, the results are compared. If the results are determined to be equal, then control proceeds to line 9. In line 9, telemetry data indicating that the original method was successfully transformed is sent to intermediary computer 130. Otherwise, if the results are determined not to be equal, then control proceeds to line 11. In line 11, telemetry data indicating that the original method was not successfully transformed is sent to intermediary computer 130. Other embodiments may add to, remove from, reorder, and/or modify any of the telemetry data sent to intermediary computer 130.

4.1.4 Selectively Intercepting Calls

A set of supervisor operations need not intercept all calls to all methods. A set of supervisor operations may selectively intercept method calls by selectively reassigning the original aliases for particular methods and/or operations. For example, in FIG. 3, supervisor unit 310 need not reassign the alias for a particular untransformed method, which operates on untransformed object 352. Accordingly, supervisor unit 310 may fail to intercept untransformed method call 312.

4.1.5 Updating Calls to Transformed Operations

When an operation is transformed, instructions that make calls to the original operation may be transformed as well. For example, if a JavaScript method, "myMethod", is transformed to use a new alias, "mySecureMethod", then instructions that call the original method using the alias "myMethod" may also be updated to use the new alias: "mySecureMethod". However, malicious code on the remote client computer, which has not passed through intermediary computer 130, is not transformed to use the new transformed aliases.

4.1.6 Example Process for a Supervisor Unit

Figure 5:
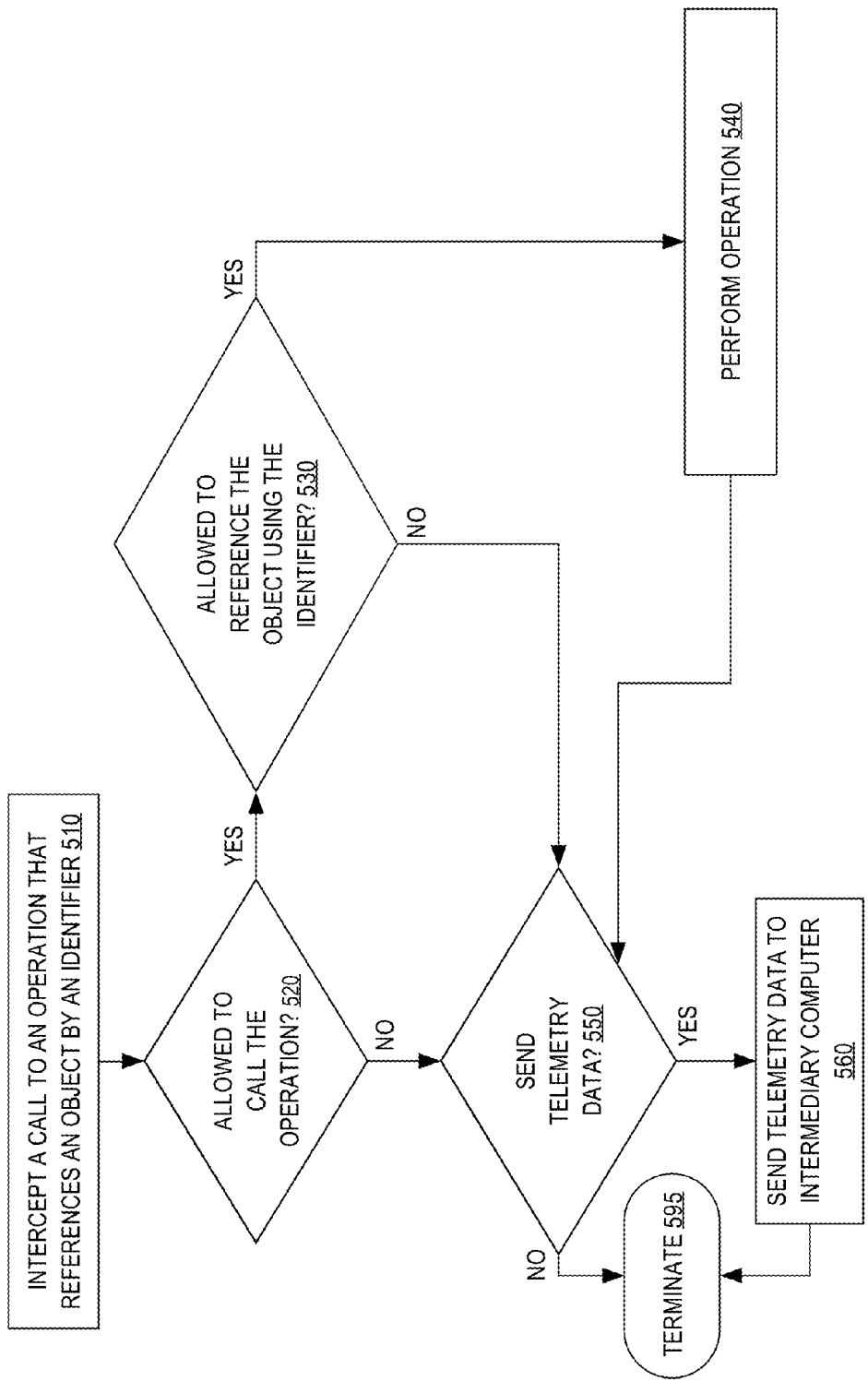
FIG. 5 illustrates a process for a supervisor unit intercepting a call and implementing one or more modes, in an embodiment.

FIG. 5 illustrates a process for a supervisor unit intercepting a call and implementing one or more modes, in an embodiment. For purposes of illustrating a clear example, FIG. 5 may be described with reference to FIG. 3. In step 510, a supervisor unit intercepts a call to an operation that references an object by an identifier. For example, supervisor unit 310 intercepts transformed method call 316, which references secure object 354 in DOM 350 with the identifier "354".

In step 520, the supervisor unit determines whether the intercepted call is allowed. For example, supervisor unit 310 may be configured to regulate calls in enforcement mode, using one or more methods discussed herein. If supervisor unit 310 determines that the transformed method call 316 is allowed, then control proceeds to step 530; otherwise, control proceeds to step 550. For purposes of illustrating a clear example, assume that supervisor unit 310 determines that transformed method call 316 is allowed, and control proceeds to step 530.

In step 530, the supervisor unit determines whether the intercepted call is allowed to reference the object using the identifier. For example, supervisor unit 310 may use one or more of the methods discussed herein to determine whether the reference to secure object 354 received in step 510 is allowable. If so, control proceeds to step 540; otherwise, control proceeds to step 550. For purposes of illustrating a clear example, assume that supervisor unit 310 determines that the identifier received in step 510, "354", is a transformed identifier and is allowed.

In step 540, the supervisor unit calls the method to perform the intended operation. For example, supervisor unit 310 may make allowed method call 326, which operates on secure object 354.

In step 550, the supervisor unit determines whether telemetry data should be sent to an intermediary server computer. If so, control proceeds to step 560; otherwise, control terminates in step 595. For purposes of illustrating a clear example, assume supervisor unit 310 is configured to operate in profiling mode for all calls intercepted by supervisor unit 310. Thus, control proceeds to step 560.

In step 560, the supervisor unit sends telemetry data to an intermediary computer. For example, supervisor unit 310 may send telemetry data describing which call was intercepted and/or any other data related to the intercepted call, such as whether the call was allowed or successfully transformed. Control then terminates in step 595.

4.2 Adding Supervisor Operations to a Set of Instructions

Figure 4:
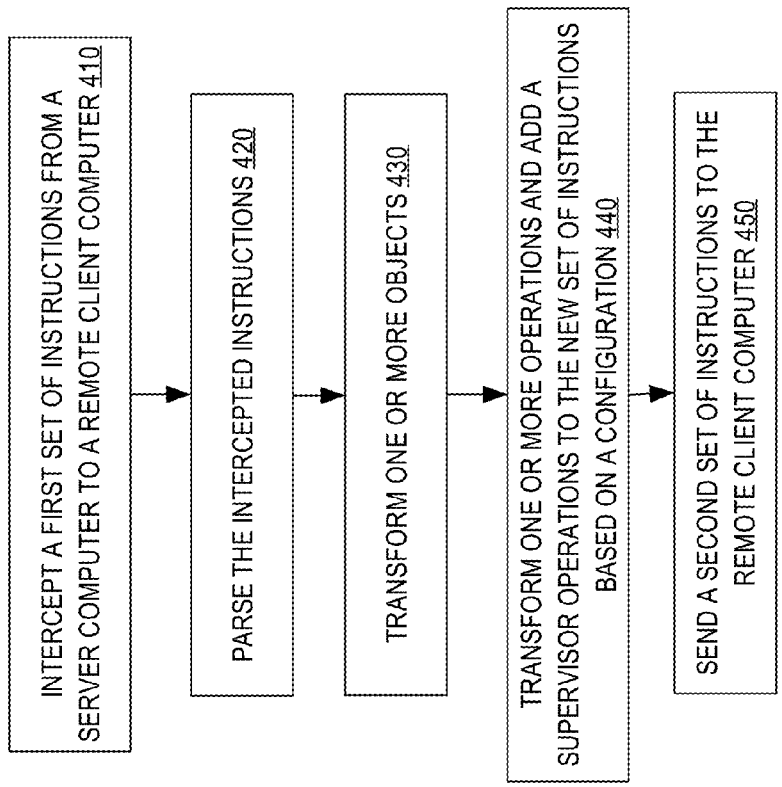
FIG. 4 illustrates a process for adding a set of supervisor operations to a set of instructions and sending the set of instructions to a client computer, in an example embodiment.

FIG. 4 illustrates a process for intercepting instructions from a server computer, rendering new instructions, adding a set of supervisor operations, and sending the new instructions with the set of supervisor operations to the intended client computer, in an example embodiment. For purposes of illustrating a clear example, FIG. 4 may be described with reference to FIG. 2, but using the particular arrangement illustrated in FIG. 2 is not required in other embodiments.

Turning now to step 410, an intermediary computer intercepts a first set of instructions from a remote server computer. For example, protocol client module 232 may receive instructions from original web server computer 202, in response to a request from visitor browser 195.

In step 420, the intermediary computer parses the intercepted instructions. For example, protocol client module 232 may send the HTML and/or JavaScript instructions to browser backend 334. Browser backend 334 may parse the received HTML and JavaScript instructions. For purposes of illustrating a clear example, assume that the intercepted set of instructions include instructions that define an original JavaScript method, which operates on an original object using an original object identifier.

In step 430, the intermediary computer transforms one or more objects. For example, forward transformer 236 may transform the original object to produce a transformed object. Specifically, forward transformer 236 may transform the original object identifier to produce a transformed object identifier, which identifies the transformed object.

In step 440, the intermediary computer transforms one or more operations and adds a set of supervisor operations to the new set of instructions based on a configuration. For purposes of illustrating a clear example, assume that configuration 132 indicates supervisor instructions should be added, which when executed, perform the original JavaScript method in profiling mode. Accordingly, forward transformer 236 transform the original operation and may add supervisor instructions, which when executed, intercept calls to the original method and implement the original method in profiling mode. As discussed herein, the modes that a set of supervisor operations uses for operations in a web page may be different based on changes in the configuration, such as configuration 132. Thus, the set of supervisor operations may implement a different set of modes for a first intercepted page than a second intercepted page, even if the first intercepted page and the second intercepted page are the same page. Furthermore, since operations and/or objects may be transformed differently each time the same set of instructions are intercepted, the supervisor instructions may be different for each intercepted set of instructions.

In step 450, the intermediary computer sends a second set of instructions to the remote client computer. For example, forward transformer 236 sends a second set of HTML and/or JavaScript instructions, which define the transformed object, the transformed JavaScript method, and the added set of supervisor operations.

Figure 6:
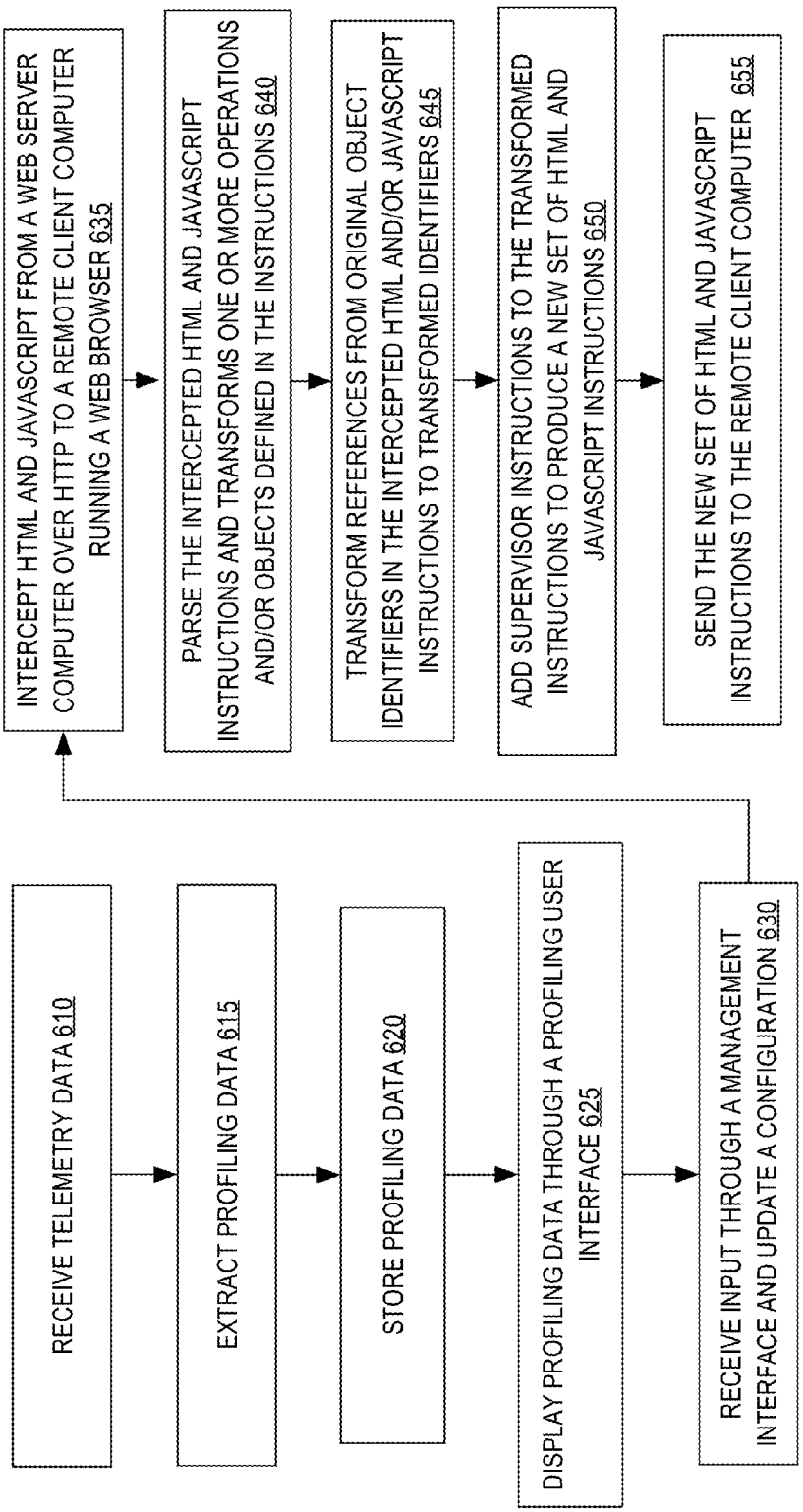
FIG. 6 illustrates a process for retrieving telemetry data, updating a configuration based on profiling data, adding a new set of supervisor operations to a set of intercepted instructions based on the updated configuration, in an example embodiment.

4.3 Adding Supervisor Operations to a Set of Instructions Based on an Updated Configuration FIG. 6 illustrates a process for retrieving telemetry data, updating a configuration of a set of supervisor modes and/or options based on profiling data, intercepting instructions from a server computer, rendering new instructions that include a set of supervisor instructions that define operations based on the updated configuration, and sending the new instructions with the set of supervisor operations to the intended client, in an example embodiment. For purposes of illustrating a clear example, FIG. 6 may be described with reference to FIG. 2, but using the particular arrangement illustrated in FIG. 2 is not required in other embodiments.

Turning now to step 610, in FIG. 6, an intermediary computer receives telemetry data over HTTP. For purposes of illustrating a clear example, assume that before step 610, a first set of HTML and JavaScript instructions with a particular JavaScript method was intercepted; the instructions were transformed and a set of supervisor operations was added to produce a second set of HTML and JavaScript instructions; the second set of HTML and JavaScript instruction were sent to the intended remote client computer. Browser 195, running on client computer 199, may send telemetry data over HTTP to telemetry handler 250 indicating that a transformed JavaScript method, aliased as "transformed_method316", was executed successfully.

In step 615, the intermediary computer extracts profiling data. For example, telemetry handler 250 may store profiling data based on the telemetry data received in step 610. The profiling data may indicate that the transformed JavaScript method aliased as "transformed_method316" was successfully executed for an instance of a web page identified as the "home page" on a particular web site. The profiling data may comprise data included in, or derived from, the telemetry data. For example, telemetry handler 250 may determine that the original alias of the transformed JavaScript method is "method316". Also for example, the profiling data may comprise data that associates the original alias and/or the transformed alias with the particular web page, "home page", for the particular web site. Also for example, the profiling data may comprise a set of data that describes how often an operations and/or objects are successfully transformed.

In step 620, the intermediary computer stores the profiling data. For example, intermediary computer 130 stores the profiling data extracted in step 615 in data store 140.

In step 625, a management computer displays profiling data through a profiling user interface. For example, in response to input from a user, management computer 150 may send a request for profiling data to data store 140. The request may include additional criteria. Data store 140 may return profiling data that matches the criteria to management computer 150. The criteria may include a one or more object identifiers, operations, web pages, web sites, dates, times, and/or any other profiling data stored in data store 140. The criteria may also specify one or more operations data store 140 should perform before sending the matching profiling data to the management computer 150, such as grouping, aggregating, and/or any other database operations. After receiving the requested profiling data, management computer 150 may cause the profiling data to be displayed through profiling interface 160.

In step 630, the management computer receives input through a management interface and updates a configuration. For example, a user may determine that a particular transformed JavaScript method, originally aliased as "method316", was successfully transformed and executed more than a particular threshold to begin having the set of supervisor operations use the enforcing mode on calls to the transformed method. Accordingly, a user may select an input that indicates, going forward, when the "home page" is intercepted, a set of supervisor operations may use the enforcing mode to enforce use of the transformed method and block use of the original JavaScript method. Management computer 150 may update configuration 132 accordingly.

In step 635, the intermediary computer intercepts HTML and JavaScript instructions from a web server computer over HTTP to a remote client computer running a web browser. For example, protocol client module 232 may receive instructions from original web server computer 202 in response to a request from browser 195 for the particular page: "home page". The instructions may comprise HTML and JavaScript instructions. For purposes of illustrating a clear example, assume that the intercepted JavaScript instructions define a JavaScript method aliased as "method316".

In step 640, the intermediary computer parses the intercepted HTML and JavaScript instructions and transforms one or more operations and/or objects defined in the instructions. For example, intermediary computer 130 may parse the intercepted HTML and JavaScript instructions and may transform the JavaScript method originally aliased as "method316", to a transformed method aliased as "transformed_method316".

In step 645, the intermediary computer transforms references from original object identifiers in the intercepted HTML and/or JavaScript instructions to transformed identifiers. For example, references to the original JavaScript method, "method316", in the intercepted HTML and JavaScript instructions may be transformed to reference the transformed JavaScript method: "transformed_method316".

In step 650, the intermediary computer adds supervisor instructions to the transformed instructions to produce a new set of HTML and JavaScript instructions. For example, intermediary computer 130 may use one or more of the methods discussed herein to add supervisor instructions based on configuration 132 to the new set of HTML and JavaScript instructions. In this example, the added supervisor instructions, when executed in a runtime environment, may intercept and block calls made to the original JavaScript method "method316", and intercept and allow calls to the transformed JavaScript method: "transformed_method316". The set of supervisor operations, when executed in the runtime environment, may also block calls to the transformed JavaScript method, "transformed_method316", if the calls use original object identifiers rather than transformed object identifiers.

In step 655, the intermediary computer sends the new set of HTML and JavaScript instructions to the remote client computer. For example, intermediary computer 130 may send the new set of HTML and JavaScript instructions, which define the set of supervisor operations and the transformed operations and/or objects, to browser 195 over HTTP.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
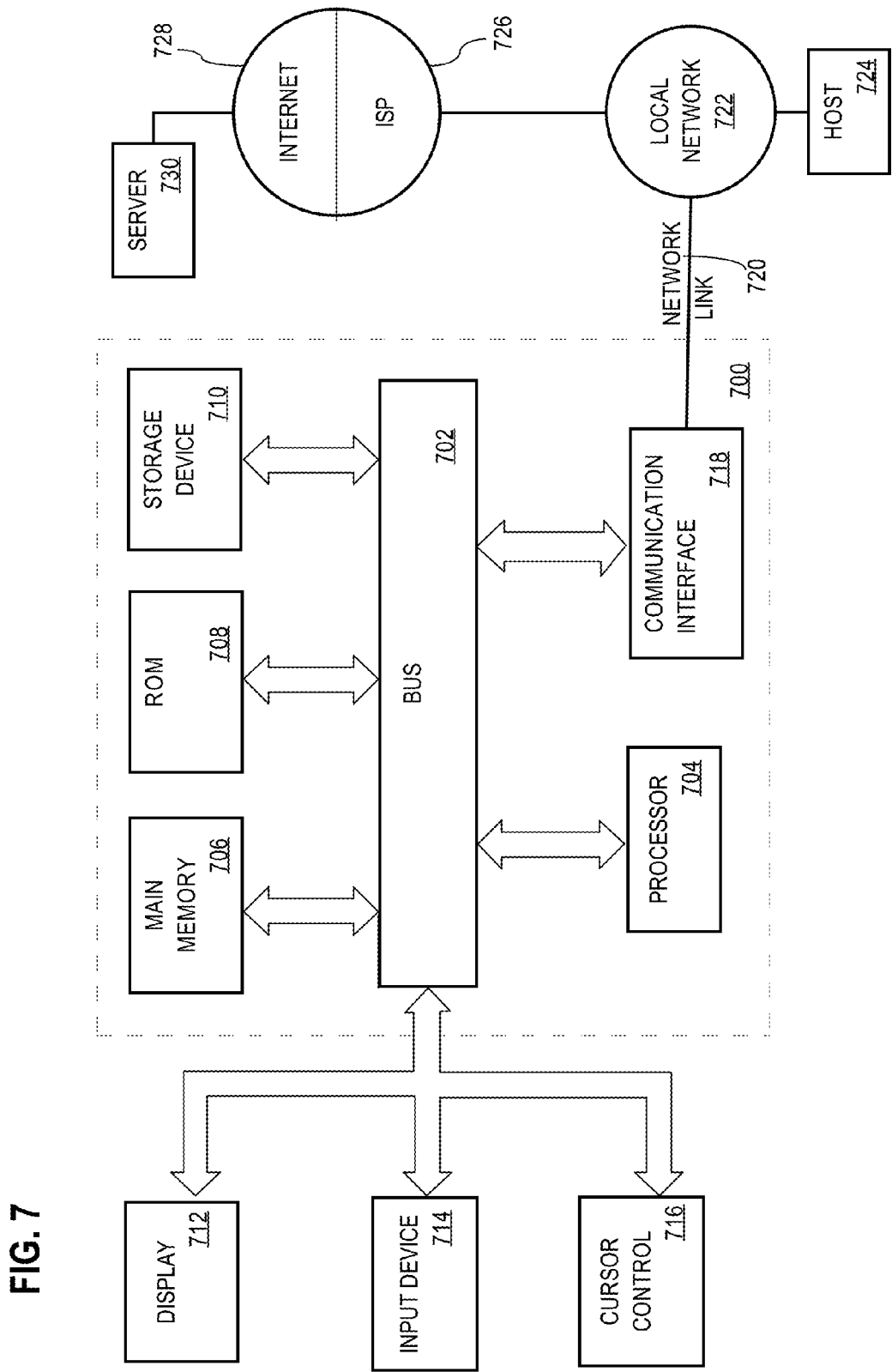
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

6.0 Other Aspects of Disclosure

Using the networked computer arrangements, intermediary computer, and/or processing methods described herein, security in client-server data processing may be significantly increased. In particular, the use of browser programs may become significantly more secure. Employing one or more of the techniques discussed herein may effectively permit obfuscating data field and/or container identifiers and DOM modification for data that is financial, personal, or otherwise sensitive so that attackers cannot determine which fields and/or containers in a web page include the sensitive data. Consequently, one or more various attacks, such as a denial of service ("DOS") attack, credential stuffing, fake account creation, ratings or results manipulation, man in the browser attacks, reserving rival goods or services, scanning for vulnerabilities, and/or exploitation of vulnerabilities, are frustrated because all fields and/or containers appear to the attacker to be gibberish, or at least cannot be identified as indicating credit card data, bank account numbers, personally identifying information, confidential data, sensitive data, proprietary data, and/or other data.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system configured to improve security of client computers interacting with server computers through an intermediary computer supervising one or more objects, and comprising:
    one or more processors;
    a processor logic coupled to the one or more processors and configured to:
      receive a first set of instructions from a server computer that define the one or more objects;
      render a second set of instructions that define the one or more objects and one or more supervisor operations, which when executed by a runtime environment on a client computer, cause the runtime environment to: intercept a call to a first operation on a remote client computer that references a particular object of the one or more objects; send a set of telemetry data to a server computer indicating the particular object was referenced by the first operation;
      send the second set of instructions to the remote client computer.

2. The computer system of claim 1, wherein the one or more supervisor operations are configured to cause the runtime environment to determine whether the first operation is allowed to reference the particular object.

3. The computer system of claim 2, wherein the one or more supervisor operations are configured to cause the runtime environment to perform the first operation in response to causing the runtime environment to determine that the first operation is allowed to reference the particular object.

4. The computer system of claim 3, wherein the one or more supervisor operations are configured to cause the runtime environment to include data in the set of telemetry data indicating that the first operation was allowed to reference the particular object and the first operation was performed.

5. The computer system of claim 2, wherein the one or more supervisor operations are configured to cause the runtime environment to terminate the call without performing the first operation in response to causing the runtime environment to determine that the first operation is not allowed to reference the particular object.

6. The computer system of claim 5, wherein the one or more supervisor operations are configured to cause the runtime environment to include data in the set of telemetry data indicating that the first operation was not allowed to reference the particular object and the call was terminated without performing the first operation.

7. The computer system of claim 1, wherein a first identifier is assigned to the particular object;
    wherein the second set of instructions includes one or more instructions, which when executed by the runtime environment on the client computer, cause the runtime environment to assign a second identifier to the particular object;
    wherein the one or more supervisor operations are configured to cause the runtime environment to include data in the set of telemetry data that indicates whether the first operation referenced the particular object by the first identifier or the second identifier.

8. The computer system of claim 1, wherein a first alias is assigned to the first operation;
    wherein the second set of instructions includes one or more instructions, which when executed by the runtime environment on the client computer, cause the runtime environment to assign a second alias to the first operation;
    wherein the one or more supervisor operations are configured to cause the runtime environment to include data in the set of telemetry data to the server computer that indicates whether the call to the first operation was made using the first alias or the second alias.

9. The computer system of claim 1, wherein the second set of instructions includes one or more instructions that define a second operation that is a transformation of the first operation;
    wherein the one or more supervisor operations are configured to cause the runtime environment to: perform the first operation and collect a first result; perform the second operation and collect a second result; determine whether the first result is equal to the second result.

10. The computer system of claim 9, wherein the one or more supervisor operations are configured to cause the runtime environment to include data in the set of telemetry data indicating that the first operation was successfully transformed into the second operation in response to determining that the first result is equal to the second result.

11. The computer system of claim 9, wherein the one or more supervisor operations are configured to cause the runtime environment to include data in the set of telemetry data indicating that the first operation was not successfully transformed into the second operation in response to determining that the first result is not equal to the second result.

12. A method for improving security of a client computer interacting with a server computer, the method comprising:
    intercepting, in a runtime environment on a client computer, a call to a first operation that references a particular object of one or more objects in memory on the client computer;
    sending a set of telemetry data to a server computer indicating that the first operation, which references the particular object, was called;
    wherein a first identifier is assigned to the particular object;
    assigning a second identifier to the particular object;
    including data in the set of telemetry data that indicates whether the first operation referenced the particular object by the first identifier or the second identifier;
    wherein the method is performed by one or more computing devices.

13. The method of claim 12 further comprising determining whether the first operation is allowed to reference the particular object.

14. The method of claim 13 further comprising, in response to determining that the first operation is allowed to reference the particular object:
    performing the first operation;
    including data in the set of telemetry data indicating that the first operation was allowed to reference the particular object and the first operation was performed.

15. The method of claim 13 further comprising, in response to determining that the first operation is allowed to reference the particular object:
  terminating the call without performing the first operation;
  including data in the set of telemetry data indicating that the first operation was not allowed to reference the particular object and the call was terminated without performing the first operation.

16. A method for improving security of a client computer interacting with a server computer, the method comprising:
  intercepting, in a runtime environment on a client computer, a call to a first operation that references a particular object of one or more objects in memory on the client computer;
  sending a set of telemetry data to a server computer indicating that the first operation, which references the particular object, was called;
  wherein a first alias is assigned to the first operation;
  assigning a second alias to the first operation;
  including data in the set of telemetry data to the server computer that indicates whether the call to the first operation was made using the first alias or the second alias.

17. A method for improving security of a client computer interacting with a server computer, the method comprising:
  intercepting, in a runtime environment on a client computer, a call to a first operation that references a particular object of one or more objects in memory on the client computer;
  sending a set of telemetry data to a server computer indicating that the first operation, which references the particular object, was called;
  performing the first operation and collecting a first result;
  performing a second operation and collecting a second result;
  determining whether the first result is equal to the second result.

18. The method of claim 17 further comprising, in response to determining that the first result is equal to the second result, including data in the set of telemetry data that indicates the first operation was successfully transformed into the second operation.

19. The method of claim 17 further comprising, in response to determining that the first result is not equal to the second result, including data in the set of telemetry data that indicates that the first operation was not successfully transformed into the second operation.

* * * * *